Oct. 7, 1952   H. T. YOUNGREN ET AL   2,612,787
DOUBLE COUNTERSHAFT TRANSMISSION
Filed July 22, 1950
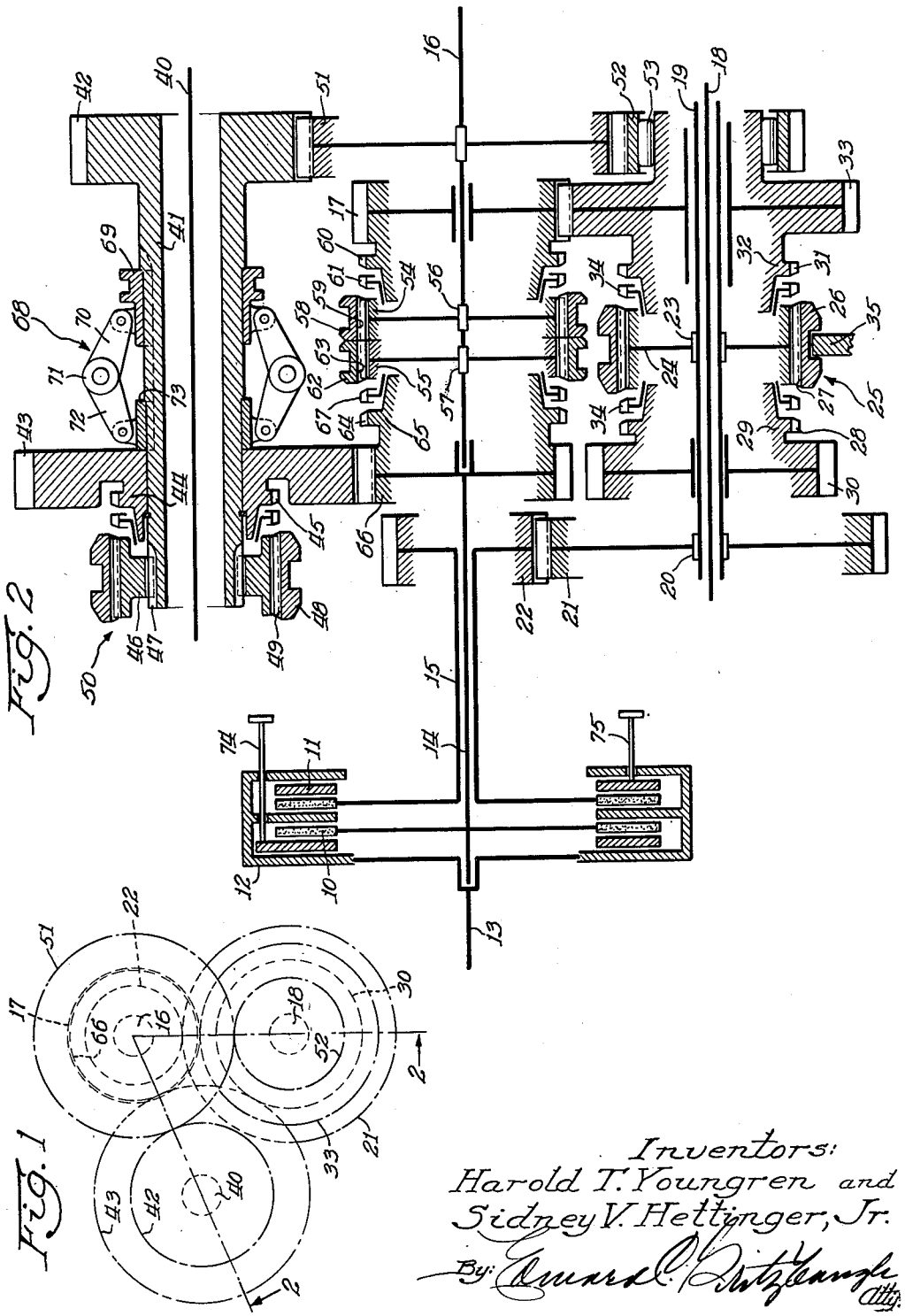
Inventors:
Harold T. Youngren and
Sidney V. Hettinger, Jr.

Patented Oct. 7, 1952

2,612,787

UNITED STATES PATENT OFFICE 2,612,787

DOUBLE COUNTERSHAFT TRANSMISSION

Harold T. Youngren, Birmingham, Mich., and Sidney V. Hettinger, Jr., Westchester, Ill., assignors to Borg-Warner Corporation, Chicago, Ill., a corporation of Illinois Application July 22, 1950, Serial No. 175,346

12 Claims. (Cl. 74—330)

The present invention relates to transmissions designed for use in connection with automotive vehicles and more particularly to a type of transmission in which the changes in gear ratio are provided by mechanisms having individual clutches which are selectively operable to produce the various gear ratios.

It is among the principal objects of the invention to provide a means for operating a transmission in which an uninterrupted flow of power from the engine is applied through the transmission during speed changes, thus giving faster and smoother pick-up as well as requiring less time to get the vehicle up to the desired speed.

Conversely, it is an object of the invention to provide a transmission which operates during deceleration of the vehicle through all but the lowest of the various gear ratios to likewise maintain a driving connection between the vehicle engine and the propelling means for the vehicle, thus rendering such deceleration more uniform while at the same time preventing the vehicle from getting out of engine control.

A further object of the invention is to provide a transmission particularly adapted for use in automotive vehicles in which the various gear ratios between the engine and the rear or drive axle are controlled by individual clutches which cause the engine power to be diverted through the proper gears to obtain the desired ratios.

In carrying out the above-mentioned objects, the invention contemplates the provision of two separate and independent friction clutches and five positive clutches. The two friction clutches are sufficient to provide operation for four forward speed gear ratios and for one reverse speed gear ratio, and the five positive clutches are capable of being selectively employed, each in combination or in series with one or the other of the two friction clutches, as the case may be, to effect the desired gear ratios. The positive clutches may be manually operated, if desired, but preferably they are automatically operated to thus provide, at least in part, automatic operation for the four possible forward gear ratios involved.

The various positive clutches preferably include synchronizing mechanism which brings one rotating member up to the rotative speed of another before effecting a connection between them, thus completing the connection without objectionable clashing of gears. The automatic means for operating the various positive clutches as well as the specific nature of the synchronizing devices form no part of this invention and no claim is made herein to any novelty associated with the same. As a consequence, the only disclosure which has been made herein of the automatic operating means and synchronizing devices has been the diagrammatic disclosure necessary to an understanding of the invention. The two friction clutches are capable of either manual or automatic operation and the disclosure of the means for operating them is likewise diagrammatic.

The provision of a transmission of the character briefly outlined above being one of the principal objects of the invention, more specifically it is a further object to provide a compact transmission unit adapted for automatic operation in which a pair of friction clutches are engaged alternately to establish driving connections through a plurality of gear trains to effect four different forward speed gear ratios and one reverse speed gear ratio and also to provide means which will permit automatic alteration of the gear ratio through progressively increasing or decreasing ratios by selectively conditioning certain of the gear trains for subsequent operation while another one is in actual operation.

A still further object of the invention is to provide a transmission of this character in which alternate operation of the two friction clutches provided is preceded by the preconditioning of certain selecting devices without interruption of the power flow from the engine through the transmission preparatory to effecting a shift in gear ratio from a low ratio to a higher one or vice versa.

Yet another and important object of the invention is to provide a transmission having a plurality of positive clutches, each capable of establishing its own individual gear train or capable in combination with one of the other positive clutches of completing a gear train, and in which two of the positive clutches are capable of being shifted in unison to establish the various desired gear trains, thereby reducing to a minimum the number of shifting operations or sequences required in proceeding from the lowest gear ratio to the highest gear ratio and vice versa. Stated in other words, it is an object of the invention to provide an arrangement of transmission gearing including a series of positive clutches effecting the various gear ratios in which two of the positive clutches are shifted in the same direction to complete a selected gear ratio so that each time one of them is shifted, the other is likewise shifted.

Another object of the invention is to provide a transmission of the character outlined above employing two separate and independent friction clutches and five positive clutches in which one of the positive clutches may remain engaged during establishment of all of the four forward speed gear ratios of which the transmission is capable of assuming and which necessarily become disengaged only when the transmission assumes its reverse speed gear ratio, and in which another of the positive clutches becomes engaged only when the transmission assumes its reverse speed gear ratio but which becomes disengaged when the transmission assumes any of its forward gear ratios. The two positive clutches just mentioned assume the form of a dual clutch arrangement having a single shift collar which operates in such a manner that movement of this collar in one direction will suffice for all forward speed gear ratios and movement of this collar in the opposite direction will suffice for the reverse speed gear ratio.

It is another object of the invention to provide a transmission of the character outlined above including a pair of countershafts and in which the various positive clutches employed are equitably distributed between the main driving shaft and the two countershafts, thereby resulting in a transmission which is considerably shorter than the conventional transmission and which, as a consequence, may be housed within a smaller transmission casing.

Other objects and advantages of the invention, not at this time specifically enumerated, will become readily apparent as the nature of the invention is better understood from the following detailed description.

In the accompanying single sheet of drawings forming a part of the specification, one embodiment of the invention has been shown. In these drawings:

Fig. 1 is a schematic end view of a transmission constructed in accordance with the principles of the present invention;

Fig. 2 is a sectional view taken substantially along the line 2—2 of Fig. 1.

In both of the above described views similar characters of reference are employed to designate similar parts.

The transmission shown schematically in the drawings employs five different gear trains and will accommodate four forward speed gear ratios and one reverse speed gear ratio. The transmission requires two friction clutches, namely a forward friction clutch 10 and a rear friction clutch 11. These clutches are associated with a fly wheel assembly 12 operatively connected to an engine drive shaft 13. The friction clutches 10 and 11 are capable of being selectively actuated by suitable control mechanism (not shown) either to connect the engine driven flywheel 12 to a main shaft 14 or to a sleeve shaft 15 rotatably mounted on the main shaft 14.

A driven shaft 16, which is adapted to be operatively connected to the drive wheels (not shown) of the vehicle with which the transmission is associated, is piloted within the rear end of the main shaft 14 and has a gear 17 rotatably mounted thereon.

A countershaft 18 fixed to the transmission casing (not shown) is held stationary and has a sleeve 19 mounted rotatably thereon. The sleeve 19 has splined thereto at 20 a gear 21 which is in constant mesh with a gear 22 formed on the sleeve shaft 15. Also splined as at 23 to the countershaft sleeve 19, and consequently rotatable therewith, is a hub 24 forming part of a speed shift conditioning and synchronizing device in the form of a positive dual clutch assembly designated in its entirety at 25. A sliding shift collar 26 having internal teeth 27 is mounted on the hub 24 and is designed for selective engagement with a series of teeth 28 provided on a hub 29 forming a part of a gear 30 or with a series of teeth 31 on a hub 32 provided on a gear 33. The gears 30 and 33 are freely rotatable upon the sleeve shaft 19 and thus it will be seen that when the shift collar 26 is moved to its extreme left hand position as viewed in Fig. 2, the internal teeth 27 of the shift collar 26 will engage the teeth 28 of the hub 29 and operatively connect the gear 30 to the sleeve 19. Similarly, when the shift collar 26 is moved to its extreme right hand position so that the teeth 27 engage the teeth 31 on the hub 32, the gear 33 will be operatively connected to the countershaft sleeve 19.

The positive clutch and synchronizing device 25 also includes a pair of floating rotative blocking members 34, having conical shaped surfaces which frictionally engage mating conical surfaces on the hubs 29 and 32 of the gears 30 and 33 respectively and prevent final shifting of the collar 26 to the left until synchronization is effected between the teeth 28 and 27 or to the right until synchronization is effected between the teeth 31 and 27. The synchronizing device per se is of conventional design and no claim is made herein to any novelty associated therewith, its function being gradually to bring the various rotating parts which are to be selectively connected together up to the same speed of rotation prior to effecting a final shift of the collar 26. A shift fork or yoke 35 is provided for the purpose of effecting movement of the collar 26.

A second countershaft 40 is provided below and to one side of the main shaft 14 and has rotatably mounted thereon a countershaft sleeve 41 having a gear 42 integrally formed therewith. A gear 43 is mounted rotatably on the countershaft sleeve 41 and has a hub portion 44 provided with teeth 45. A hub 46 is splined at 47 to the countershaft 41 and has slidably mounted thereon a shift collar 48 provided with internal teeth 49. The hub 44 together with its teeth 45, the hub 46 and the shift collar 48 together with its internal teeth 49 form part of a second speed shift conditioning and synchronizing device which likewise is in the form of a positive clutch assembly and is designated in its entirety at 50. From the above description of parts it will be seen that when the shift collar 48 is moved to its extreme right hand position, as viewed in Fig. 2, the internal teeth 49 thereof will engage the teeth 45 of the hub 44 and serve to connect the gear 43 to the countershaft sleeve 41. The synchronizing device 50 also includes a floating rotative blocking member having conical surfaces which frictionally engage mating conical surfaces on the hubs 44 and 46 and prevent final shifting of the collar 48 to the right until synchronization is effected between the teeth 48 and 45.

The driven shaft 16 has a gear 51 splined thereto which meshes with the gear 42 secured to the countershaft sleeve 41, and which also meshes with a gear 52 secured to the gear 33 by means of a one-way engaging device 53. When the gear 33 is rotated in a forward direction the one-way engaging device 53 functions to drive the gear 52 which in turn drives the gear 51, but when the gears 51 and 52 rotate forwardly at a speed greater than the speed at which the gear 33 is rotating the gear 52 overruns the gear 33 by means of the one-way engaging device 53. The driven shaft 16 also has a pair of hubs 54 and 55 respectively splined thereto at 56 and 57. Surrounding the hub 54 is a shift collar 58 having internal teeth 59 which mesh with corresponding external teeth on the hub 54 and which are adapted to engage with teeth 60 secured to the gear 17. A synchronizing device for synchronizing the speeds of rotation of the teeth 59 and 60 includes a floating rotative blocking member 61 having conical surfaces which frictionally engage mating conical surfaces secured to the gear 17. The hub 55 is surrounded by a slidable collar 62 having internal teeth 63 which mesh with corresponding external teeth on the hub 55 and which also mesh with teeth 64 on a hub 65 of a gear 66 secured to the main shaft 14. A synchronizing device is provided for synchronizing the speeds of rotation of the teeth 63 and 64 prior to engagement therebetween and includes a floating rotative blocking member 67 having conical surfaces that frictionally engage mating conical surfaces on the hub 65 to prevent final shifting of the collar 62 to the left until synchronization is effected between the speeds of rotation of the teeth 63 and 64. It is apparent that shifting of the collar 58 to the right, whereby its internal teeth 59 engage the teeth 60 secured to the gear 17, will cause the gear 17 to be connected to the driven shaft 16. When the collar 62 is shifted to the left, such that its internal teeth 63 engage the teeth 64, the gear 66 will be directly connected to the driven shaft 16.

The shift collars 26, 48, 58 and 62 collectively embody five positive clutches which are employed in the present invention for controlling the operation of the transmission through four forward speed ratios and one reverse speed ratio. These shift collars may be manually controlled or they may be automatically controlled by operative instrumentalities which in turn are operated under the control of any one or a combination of such factors as engine speed, the speed of the vehicle, the position of the vehicle accelerator pedal, the degree of volume in the intake manifold of the vehicle, the viscosity of the oil in the transmission housing, etc.

In order to control the shifting of the shift collars 26, 48, 58 and 62 in accordance with the speed of the vehicle, a governor designated in its entirety by reference numeral 68, may be mounted on the countershaft sleeve 41. The details of the governor 68 form no part of the present invention, and, as shown, this governor is of conventional form including a sleeve member 69 which is slidably splined on the countershaft sleeve 41 and which is pivotally connected by a series of links 70 to a series of weights 71. The weights 71 are in turn pivotally connected to a series of links 72 which themselves are pivotally connected to a plurality of lugs 73 secured to the sleeve 41. A coil spring (not shown) surrounding the sleeve 41 is mounted between the lugs 73 and the sleeve member 69 to maintain the sleeve member 69 in its right-hand position when the countershaft sleeve 41 is at rest. When the countershaft sleeve 41 commences to rotate, the weights 71 are thrown radially outwardly against the action of the compression spring between the lugs 73 and sleeve 69 under the influence of centrifugal force so as to draw the sleeve 69 to the left. A yoke may be provided as a take-off device for transmitting the motion of the sleeve 69 to a suitable transmission control mechanism (not shown). The transmission control mechanism may then be employed to control any or all of the shift collars 26, 48, 58 and 62.

The clutches 10 and 11 may be brought into clutching engagement with the fly wheel assembly 12 by any well known means. In the present disclosure these means are shown schematically as a pair of operating members 74 and 75. Movement of the member 74 to the right causes engagement of the friction clutch 10 with the fly wheel assembly 12 and movement of the operating member 75 to the left moves the friction clutch 11 into engagement with the fly wheel assembly 12. It is contemplated that only one of the friction clutches, 10 and 11 will be engaged with the fly wheel assembly 12 at any one time, but that both may be disengaged therefrom at the same time.

In the operation of the present transmission low forward speed or first gear may be obtained by moving the shift collar 26 to the right until its internal teeth 27 engage the teeth 31 secured to the gear 33, and thereafter engaging the friction clutch 11 with the flywheel assembly 12. The collar 26 remains in its rightward position during all forward speeds. The gear train for low speed or first gear then proceeds from the drive shaft 13 through the flywheel assembly 12 and friction clutch 11, through the sleeve shaft 15, gears 22 and 21, countershaft sleeve 19, hub 24, slidable collar 26, teeth 31, the one-way engaging device 53, the gears 52 and 51, to the driven shaft 16.

While the low forward speed gear train is operating the positive clutch which includes the collar 48 may be moved to the right to bring its internal teeth 49 into engagement with the teeth 45 secured to the gear 43. If the friction clutch 11 is then disengaged from the flywheel assembly 12 and the friction clutch 10 is engaged with the flywheel assembly 12, a second forward speed drive ratio between the drive shaft 13 and the driven shaft 16 will be provided. The second speed power train proceeds from the drive shaft 13 through the flywheel assembly 12 and the friction clutch 10, through the shaft 14, gears 66 and 43, through the teeth 45, collar 48, hub 46, countershaft sleeve 41, and gears 42 and 51 to the driven shaft 16.

During the operation of second forward speed the transmission may be conditioned for third forward speed which will become established upon the disengagement of the friction clutch 10 and engagement of the friction clutch 11 with the flywheel assembly 12. In order to condition the transmission for third forward speed the collar 26 remains in its rightward position with its internal teeth 27 engaged with the teeth 31 and the collar 58 is moved to the right to bring its internal teeth 59 into engagement with the teeth 60. Upon disengagement of the friction clutch 10 and engagement of the friction clutch 11, when the collars 26 and 58 have both been moved to their right hand positions, the third forward speed gear train is established which proceeds from the drive shaft 13 through the flywheel assembly 12 and the friction clutch 11, through the sleeve shaft 15, gears 22 and 21, hub 24, slidable collar 26, teeth 31, gears 33 and 17, teeth 60, collar 58, and hub 54 to the driven shaft 16. When the third forward speed gear train is operating the gear 51 rotates with the driven shaft 16 and in so rotating meshes with and causes the gear 52 to rotate forwardly at a higher speed than the speed of rotation of the gear 33. At this time the one-way engaging device 53 merely overruns which permits the gear 52 to rotate more rapidly than the gear 33.

During the operation of the third forward speed gear train the transmission may be conditioned for fourth forward speed, which constitutes a direct drive between the drive shaft 13 and the driven shaft 16. In order to condition the transmission for direct drive the collar 62 is moved to the left to engage the teeth 64 secured to the hub 65 of the gear 66. When the friction clutch 11 is subsequently disengaged from the flywheel assembly 12 and the friction clutch 10 engaged therewith the direct drive condition will be established. Thus when the collar 62 is moved to the left and the clutch 10 is engaged a direct drive is established which proceeds from the drive shaft 13 through the flywheel assembly 12 and the friction clutch 10, through the shaft 14, gear 66, teeth 64, collar 62 and hub 55 to the driven shaft 16.

The transmission may be down-shifted when either the second, third or fourth forward speed gear train is established by merely engaging the positive clutch or clutches of the next lower forward speed gear train and subsequently disengaging the engaged friction clutch and engaging the other friction clutch.

Reverse drive may be established between the drive shaft 13 and driven shaft 16 by moving the shift collar 48 to the right, whereby its teeth mesh with the teeth 45 integral with the gear 43, moving the shift collar 26 to the left whereby its internal teeth mesh with the teeth 28 of the gear 30 and engaging the friction clutch 11 with the flywheel assembly 12. Under this condition the gears 30 and 43, which mesh with each other, provide a reversal for the drive between the drive and driven shafts and the power train for the reverse drive proceeds from the drive shaft 13 through the flywheel assembly 12 and friction clutch 11, through the sleeve 15, gears 22 and 21, hub 24, collar 26, teeth 28, gears 30 and 43, teeth 45, collar 48, hub 46, sleeve shaft 41, and gears 42 and 51 to the driven shaft 16.

As has been stated heretofore, the governor 68 rotates with the countershaft sleeve 41 and because of the relative sizes of the gear 51, which is secured to the driven shaft 16, and the gear 42, the governor 68 is rotated at a higher speed during all of the gear trains than the driven shaft 16. This provides a more sensitive governor than could be had by securing it to the driven shaft 16 or to any other shaft which might rotate at a slower speed than the driven shaft 16.

The present invention has been described with reference to but a single embodiment, however, it is obvious that numerous changes and modifications may be made without departing from the spirit or scope of the invention.

We claim:

1. In a transmission, the combination of a drive shaft, a driven shaft, and means for providing a plurality of different gear trains including a reverse gear train between said shafts, a first one of said gear trains including a first friction clutch, a first positive clutch and a one-way engaging means for rendering said first gear train effective, a second one of said gear trains including a second friction clutch and a second positive clutch for rendering said second gear train effective, a third one of said gear trains including said first friction clutch, said first positive clutch and a third positive clutch for rendering said third gear train effective, said reverse train including said first friction clutch, said second positive clutch and a fourth positive clutch for rendering said reverse gear train effective.

2. In a transmission, the combination of a drive shaft, a driven shaft, and means for providing a plurality of different gear trains including a reverse gear train between said shafts, a first one of said gear trains including a first friction clutch and a first positive clutch for rendering said first gear train effective, a second one of said gear trains including a second friction clutch, a second positive clutch and a third positive clutch for rendering said second gear train effective, a third one of said gear trains including said first friction clutch and a fourth positive clutch for rendering said third gear train effective, and said reverse gear train including said second friction clutch, said first positive clutch, and a fifth positive clutch for rendering said reverse gear train effective.

3. In a transmission, the combination of a drive shaft, a driven shaft, and means for providing a plurality of different gear trains between said shafts, one of said gear trains providing a relatively low speed ratio between said shafts, another of said gear trains providing an intermediate speed gear ratio between said shafts, and a third one of said gear trains providing a relatively high speed gear ratio between said shafts, said gear train providing said relatively low speed gear ratio between said shafts including a first friction clutch and a first positive clutch for rendering the gear train effective, said gear train providing said intermediate speed gear ratio between said shafts including a second friction clutch and a second positive clutch for rendering the gear train effective, and the gear train for providing said relatively high speed gear ratio between said shafts including said first friction clutch, a third positive clutch and said first positive clutch for rendering the gear train effective.

4. In a transmission, the combination of a drive shaft, a driven shaft, and means for providing a plurality of different gear trains including a reverse gear train between said shafts, a first one of said gear trains including a first friction clutch, a first positive clutch and a one-way engaging means for rendering said first gear train effective, said one-way engaging means in said first gear train providing free wheeling during the operation of said first gear train when said driven shaft tends to drive said drive shaft, a second one of said gear trains including a second friction clutch and a second positive clutch for rendering said second gear train effective, a third one of said gear trains including said first friction clutch, said first positive clutch and a third positive clutch for rendering the third gear train effective, said reverse gear train including said first friction clutch, said second positive clutch and a fourth positive clutch for rendering the reverse gear train effective.

5. In a variable speed transmission, the combination of a driving means, a driven shaft, a first set of countershaft gearing, a second set of countershaft gearing, and means for providing a plurality of gear trains between said driving means and said driven shaft including both of said sets of countershaft gearing, a selectively operable clutch associated with said first set of countershaft gearing for rendering gear trains through the first set of countershaft gearing effective, a second selectively operable clutch associated with said second set of countershaft gearing for rendering gear trains through the second set of countershaft gearing effective, and means interconnecting both of said sets of countershaft gearing and effective upon the selective operation of both of said clutches for rendering a gear train through both of said sets of countershaft gearing effective.

6. In a variable speed transmission, the combination of a driving means, a driven shaft, a first set of countershaft gearing, a second set of countershaft gearing, and means for providing a plurality of forward speed gear trains and a reverse speed gear train between said driving means and said driven shaft including both of said sets of countershaft gearing, a selectively operable clutch associated with said first set of countershaft gearing for completing a first one of said forward speed gear trains through the first set of countershaft gearing, a second selectively operable clutch associated with the second set of countershaft gearing for completing a second forward speed gear train through the second set of countershaft gearing, and means interconnecting both of said sets of countershaft gearing and effective upon the selective operation of both of said clutches for completing said reverse speed gear train through both of said sets of countershaft gearing.

7. In a variable speed transmission, the combination of a driving means, a driven shaft, a first set of countershaft gearing, a second set of countershaft gearing, and means for providing a plurality of gear trains between said driving means and said driven shaft including both of said sets of countershaft gearing, a selectively operable clutch associated with said first set of countershaft gearing for rendering gear trains through the first set of countershaft gearing effective, a second selectively operable clutch associated with said second set of countershaft gearing for rendering gear trains through the second set of countershaft gearing effective, means interconnecting both of said sets of countershaft gearing and effective upon the selective operation of both of said clutches for rendering a gear train through both of said sets of countershaft gearing effective, and a third selectively operable clutch for providing a gear train which by-passes both of said sets of countershaft gearing.

8. In a variable speed transmission, the combination of a driving means, a driven shaft, a first set of countershaft gearing, a second set of countershaft gearing, and means for providing a plurality of gear trains between said driving means and said driven shaft including both of said sets of countershaft gearing, a selectively operable clutch associated with said first set of countershaft gearing for rendering a relatively low speed gear train through the first set of countershaft gearing effective, a second selectively operable clutch associated with said second set of countershaft gearing for rendering a relatively high speed gear train through the second set of countershaft gearing effective, means interconnecting both of said sets of countershaft gearing and effective upon selective operation of both of said clutches for rendering a reverse speed gear train through both of said sets of countershaft gearing effective, and a third selectively operable clutch for rendering a direct drive between said driving means and driven shaft effective which by-passes both of said sets of countershaft gearing.

9. In a variable speed transmission of the double countershaft gearing type, the combination of a driving means, a driven shaft, a first set of countershaft gearing, a second set of countershaft gearing, a first selectively operable engaging means directly connected with said first set of countershaft gearing for establishing a first gear train between said driving means and said driven shaft through said first set of countershaft gearing, a second selectively operable engaging means directly connected with said second set of countershaft gearing for establishing a second gear train between said driving means and said driven shaft through said second set of countershaft gearing, and a third selectively operable engaging means directly connected with said second set of countershaft gearing and effective upon the simultaneous operation of said first engaging means for establishing a third gear train between said driving means and driven shaft through both of said sets of countershaft gearing.

10. In a variable speed transmission of the double countershaft gearing type, the combination of a driving means, a driven shaft, a first set of countershaft gearing, a second set of countershaft gearing, a first selectively operable engaging means directly connected with said first set of countershaft gearing for establishing a first gear train between said driving means and said driven shaft through said first set of countershaft gearing, a second selectively operable engaging means directly connected with said second set of countershaft gearing for establishing a second gear train between said driving means and said driven shaft through said second set of countershaft gearing, a third selectively operable engaging means directly connected with said second set of countershaft gearing and effective upon the simultaneous operation of said first engaging means for establishing a third gear train between said driving means and driven shaft through both of said sets of countershaft gearing, and a fourth selectively operable engaging means effective upon the simultaneous operation of said second engaging means for establishing a fourth gear train between said driving means and driven shaft through said second set of countershaft gearing.

11. In a variable speed transmission of the double countershaft gearing type, the combination of a driving means, a driven shaft, a first set of countershaft gearing, a second set of countershaft gearing, a first selectively operable engaging means directly connected with said first set of countershaft gearing for establishing a first power train between said driving means and said driven shaft through said first set of countershaft gearing, a second selectively operable engaging means directly connected with said second set of countershaft gearing for establishing a second power train between said driving means and said driven shaft through said second set of countershaft gearing, a third selectively operable engaging means directly connected with said second set of countershaft gearing and effective upon the simultaneous operation of said first engaging means for establishing a third power train between said driving means and driven shaft through both of said sets of countershaft gearing, and a fourth selectively operable engaging means for establishing a fourth power train between said driving means and driven shaft by-passing both of said sets of countershaft gearing.

12. In a variable speed transmission of the double countershaft gearing type, the combination of a driving means, a driven shaft, a first set of countershaft gearing, a second set of countershaft gearing, a first selectively operable engaging means directly connected with said first set of countershaft gearing for establishing a first power train between said driving means and said driven shaft through said first set of countershaft gearing, a second selectively operable engaging means directly connected with said second set of countershaft gearing for establishing a second power train between said driving means and said driven shaft through said second set of countershaft gearing, a third selectively operable engaging means directly connected with said second set of countershaft gearing and effective upon the simultaneous operation of said first engaging means for establishing a third power train between said driving means and driven shaft through both of said sets of countershaft gearing, a fourth selectively operable engaging means effective upon the simultaneous operation of said second engaging means for establishing a fourth power train between said driving means and driven shaft through said second set of countershaft gearing, and a fifth selectively operable engaging means for establishing a fifth power train between said driving means and driven shaft bypassing both of said sets of countershaft gearing.

HAROLD T. YOUNGREN.
SIDNEY V. HETTINGER, Jr.

REFERENCES CITED

The following references are of record in the file of this patent:

UNITED STATES PATENTS

| Number | Name | Date |
|---|---|---|
| 992,967 | Lever | May 23, 1911 |
| 1,453,032 | Soden-Fraunhopen | Apr. 24, 1923 |
| 2,315,808 | Miller | Apr. 6, 1943 |
| 2,485,688 | Banker | Oct. 25, 1949 |

FOREIGN PATENTS

| Number | Country | Date |
|---|---|---|
| 604,178 | Great Britain | June 29, 1948 |